2,844,469

PRESSURIZED SALAD DRESSING AND METHOD OF PREPARING THE SAME

Daniel Melnick, Teaneck, and Jack Akerboom, Bridgeton, N. J.

No Drawing. Application August 18, 1955
Serial No. 529,316

22 Claims. (Cl. 99—144)

This invention relates to a novel fat-in-water emulsion and, more particularly, it pertains to a novel fat-in-water emulsion usable as a salad dressing packaged in pressurized containers to produce a novel stable foam.

As known in the art, a stable semi-solid food emulsion can be obtained by dispersing a limpid salad oil into an aqueous phase containing vinegar, water and flavorings and stabilizing the emulsion with an emulsifying agent such as egg material. Starches, flour or gum may be added to provide the desired body or texture characteristics. The salad dressing is prepared by first making a cooked paste of starch, water and salt. The other ingredients are mixed as in the preparation of a mayonnaise and then admixed with the cooked paste. The total mixture is homogenized and packed for commercial use.

The quality and quantity of the vegetable oil component in the salad dressing has a marked effect on the quality thereof. The suitability of the oil is determined largely by the cold test value, which is the number of hours during which the oil may be stored at 32° F. before the first sign of crystallization occurs. Generally, salad oils have a minimum cold test value of at least 5½ hours. Salad oils may be prepared to possess a desired cold test value by "winterizing" a starting oil and filtering off the glycerides which crystallize when the oil is held at low temperatures. Improved soya bean salad oils involving hydrogenation of liquid soya bean oil to specified limits also require winterization prior to use in the manufacture of salad dressing. It is accepted in the art that as the cold test value of a salad oil increases, the salad dressing or mayonnaise in which it is used can withstand cold temperatures better to exhibit greater emulsion stability.

Investigations were carried out to prepare a pressurized salad dressing or a salad dressing which is placed under pressure in a container. The purpose of pressurizing the salad dressing is to produce a stable foam dressing upon release from the container much in the same manner as "whipped" cream is released as a foam from pressurized containers at present. Such a foam must be stable for appreciably long periods of time and the salad dressing must be expressible from the container to an economical extent to make the product commercially feasible. With this view, various types of salad dressings were prepared for experimentation starting with the premise that since high cold test value salad dressings usually produce stable emulsions and a pressurized salad dressing must be stable, such salad dressings should be most suitable for the purpose. Contrary to expectations it was found that such salad dressings before or after homogenization are wholly inadequate for the purpose, primarily for the reason that the foam produced is too unstable. In another step of the investigation a solid fat was mixed thoroughly with a conventional salad dressing at ambient temperature until an oil-in-water emulsion dispersed in solid fat was obtained. An examination of the emulsion revealed that the oil of the original salad dressing and the dispersed solid fat were district entities or particles separated by an aqueous barrier. Such products are expelled to only a very limited degree from pressurized containers with instantaneous collapse of whatever foam is obtained.

After several unsuccessful tests it became apparent that technical information on the subject of salad dressings and pressurized food stuffs was not helpful, but that the problem of obtaining a commercially valuable pressurized salad dressing would require a non-conventional approach. Accordingly, a series of tests were made in which the ingredients were varied and the method of preparation changed to determine the foam stability of the expressed emulsion, over-run and the amount of emulsion expressible from the container. As a result it was discovered that through a new method of emulsion preparation, a novel emulsion of exceptional properties is obtained. Quite unexpectedly it was found that the nature of the oil component and the size and character of the dispersed oil particle had to be changed drastically from known standards in producing a commercial pressurized salad dressing.

Therefore, an object of this invention is to provide a novel salad dressing.

Another object of this invention is to provide a pressurized salad dressing.

A further object is to provide a novel method for preparing any of the aforementioned novel products.

In accordance with this invention, the novel salad dressing comprises an edible vegetable fat having a 0.0 cold test value, a melting point of about 80° to about 110° F., a setting point of about 55° to about 90° F., and composed of homogeneous fat particles of less than about 10 microns average size dispersed in an aqueous medium, which contains an emulsifying agent and an acidifying agent. For the purpose of this invention homogeneity of the fat particles means that all the fat particles have the same fat composition. The above fat-in-water emulsion may be combined with a soluble propellant gas and the total material is confined within a container under suitable pressure in order that the salad dressing can be expelled therefrom as desired.

More specifically, the invention is concerned with a composition comprising homogeneous particles having an average particle size of less than about 10 microns of a vegetable fat above described dispersed in an aqueous medium and an edible non-toxic gas dissolved therein, said composition containing an emulsifying agent and an acidifying agent and maintained in a container under superatmospheric pressure and said composition, on expulsion from an orifice in said container, forming a foam consisting of a co-emulsion of fat particles and fine gas globules dispersed in the aqueous medium, said foam having an over-run of at least about 100% and said foam being stable for at least 10 minutes.

The vegetable fat component which is used for the purpose of this invention has a melting point of about 80° to about 110° F., more usually about 90° to 100° F., and preferably about 93° to 97° F. When the vegetable fat is tested by the method usually applied to salad oils it has a cold test of 0.0 hours, as contrasted with the minimal standard of 5.5 hours for a conventional salad oil. The vegetable fat is an edible material which is derived from any suitable vegetable source and which has been hydrogenated to the desired extent. It is also contemplated that the vegetable fat component comprises a single ingredient or it can be an admixture including an oil which is liquid and has a lower melting point than is desired provided the final blend has the desired characteristics given above. The vegetable fat of this invention has a setting point of about 55° to about 90° F., more usually about 60° to about 80° F., and preferably about 65° to about 75° F. From the standpoint of foam stability, it is preferred to use vegetable fats having high melting points; however, as the melting point of the vegetable fat component is increased the tendency for some of the emulsion to remain in the container after it is depressurized by expelling the propellant gas increases, thus representing a loss to the consumer. Stated another way, emulsions made with low melting point vegetable fats are more readily expelled from pressurized containers with the propellant gas than the high melting point fats; however, they produce foams which are less stable than those made with the higher melting point vegetable fat components. One of the preferred classes of vegetable fats has an iodine value of about 60 to 95, however, the iodine value can vary considerably, for example, from about 0 to 30 for tropic fats containing substantial quantities, viz. more than 50% total, of lauric and myristic acids in triglyceride foam; included in this latter group are coconut, babassu, palm kernel, etc.; provided when used either alone or as a blend with other fats, such fats give the desired melting point and setting point range. Additionally, the vegetable fat must be in emulsified form, possess homogeneity and have the essential particle size. The requisite particle size is essential to obtaining expressibility of the emulsion, desirable foam appearance and adequate foam over-run. Generally, the vegetable fat component comprises not more than about 50% by weight, and not lower than about 20%, more usually about 30 to about 40% by weight, and preferably about 30 to about 35% by weight, based on the total salad dressing prior to the addition of propellant gas. As would be expected, a salad dressing emulsion containing such high melting point fat in relatively low quantities compared with the water component is very unstable upon standing, i. e. separating into water and fat layers. Such normally unacceptable salad dressings are, however, acceptable compositions for producing stable salad dressing foam.

Water is an essential ingredient of the emulsion because it provides the medium for dispersion of the fat component therein. Generally, water added as such or as part or parts of other components constitutes about 20 to about 70% by weight, and preferably about 30 to about 50% by weight, based on the finished emulsion prior to gas addition, whether various types of flavoring agents are added or not. It is found that the quantity of water which is present in the present emulsion can exceed that amount which will produce stable material for unusually long periods of time. The reason is that the excess water will separate from the emulsion forming a separate layer; however, it will have no adverse effect upon the remaining emulsion. Thus, it was also found that if separation does occur, simple agitation of the fat-in-water emulsion and water layer, through shaking of the pressurized container, will result in re-incorporation of the water layer.

The fat-in-water emulsion can contain an edible water binding agent such as, for example, flour, gelatin, starch, vegetable gum, e. g. tragacanth, etc. The water binding agent can be any one of the well known materials. In general, the water binding agent is used in quantities of at least 0.05% by weight and up to about 4% by weight, based on the total composition prior to gas addition. This agent serves to enhance the emulsification characteristics of the product by helping to prevent water separation from the emulsion.

An edible acidifying agent is employed in the preparation of the salad dressing of the invention. The acidifying agent is, for example, vinegar, lemon juice, citric acid, etc. The acidifying agent is added in an amount to provide the aqueous medium or the finished salad dressing with a pH in the range of about 3 to 5. In addition, edible flavoring agents can be added to the salad dressing to obtain the desired flavor. Flavoring agents are, for example, common salt (NaCl), sugar, etc. In general, the flavoring agents and the acidifying agents comprise about 3 to 50% by weight of the total salad dressing, prior to gas addition. It is to be noted that vinegar, salt and the like serve to inhibit microbiological growth in the salad dressing.

In the preparation of the salad dressing, an edible emulsifying agent is used in order to maintain a stable fat-in-water emulsion. While various types of well known edible emulsifying agents can be used with varying degrees of success, for the purpose of this invention it was found that excellent results are obtained with the use of egg yolk alone or whole egg. For the purpose of this specification and the appended claims, the expression "egg yolk-containing material" is intended to cover egg yolk per se and whole egg or any other material containing egg yolk in soluble form. In connection with the use of egg yolk in various concentrations, it was found that an increase in the quantity of the emulsifying agent reduces the viscosity of the emulsion. However, as the fluidity increases or the viscosity of the emulsion decreases, it is found that foam stability and rigidity may decrease. Generally, the emulsifying agent can be used in an amount of about 0.5 to 9% by weight, based on the total composition or salad dressing, prior to gas addition. When employing egg yolk it is preferred to use at least 3% by weight and up to about 9% by weight, based on the total composition prior to gas addition, and still more preferred about 4 to about 7% by weight, on the same basis. It will be recognized from the foregoing that some of the novel salad dressings of the present invention will conform both quantitatively and qualitatively to the Standard of Identity of Salad Dressing as promulgated by the U. S. Food and Drug Administration.

We have found that, in order to obtain a stable emulsion and a long-lasting foam after expulsion from the pressurized container, the desired ingredients of the salad dressing must be maintained at a temperature at which the fat component is present in a liquid state before and during the homogenization thereof. Although our novel fat component is normally a solid at ambient temperature, it is essential that it be present in a melted state during the preparation in order to attain homogeneity of the fat particles dispersed in the aqueous medium. Generally speaking, the fat component can be kept in the melted state when cooled to a point just above the setting point, at the melting point, or at any temperature above the melting point, such as, for example, at least 10° F. greater than the melting point. The temperature to be used in the preparation of the emulsion can be as high as about 130° F., more usually as high as about 115° F., and preferably as high as about 110° F. As a result of the homogenizing step of the preparation, our product contains the homogeneous fat particles having an average particle size of less than about 10 microns, more usually less than about 5 microns, and preferably less than about 3 microns. It is found that the foams resulting from our emulsions are stable for at least 10 minutes and they have an over-run of at least about 100% and up to about 600%, preferably about 200 to 500%. The foam stability is measured at 75° F., and over-run is compared with the same salad dressing prior to aeration with a specific gravity of from 0.95 to 1.10. Further, our foam can be used on products which are stored at a temperature of about 0° F. or lower, and it will provide at the time of serving a salad dressing which is homogeneous in appearance and has eating quality as good as the product possesses at room temperature prior to lower temperature storage.

The preparation of the salad dressing is preferably conducted by heating the water binding agent and a portion of the water until the desired consistency or result is achieved, and thereafter, the temperature is adjusted to within the desired range for the preparation of the emulsion. The mayonnaise component or portion of the salad dressing is prepared by first mixing the emulsifying agent, e. g. egg with a portion of the water and heating the same to the desired temperature. Following, the fat component is melted and held at the desired temperature and then it is combined with the egg-water mixture and the resulting mass is mixed or thoroughly agitated by a mechanical agitator. After the fat, water and emulsifying agent are thoroughly mixed, an acidifying agent, with or without flavoring agents, can be added thereto. Thereafter the mixture of water binding agents and water is combined with the mayonnaise component and the total mixture is passed (while the fat component is in the melted state) through a conventional homogenizer to yield the thin pourable emulsion or salad dressing of this invention. When cold-water-soluble starches or vegetable gums are added in place of conventional starches or flours, paste and mayonnaise components need not be prepared separately. One pre-mix of all components may then be prepared at a desired temperature at one time and this homogenized.

Another important step in the preparation of the emulsion is to subject the homogenized product or material to a chilling treatment or a temperature which is below the setting point of the fat, more usually at least about 10° F. below the setting point, and preferably at least about 20° F. below the setting point thereof. The temperature can be just above the freezing point of the aqueous phase of the emulsion or salad dressing. The chilling treatment is conducted until the fat is at least partially solidified. It is preferred that the chilling treatment is conducted after the salad dressing or emulsion is placed in the pressurized container and the same is subjected to propellant gas pressure. In a quiescent state, the chilling is carried on for preferably at least 24 hours, whereas with agitation, the time is preferably at least about 3 hours. Therefore, the chilling treatment is conducted for a period of at least about 3 hours and up to about 60 days. However, it should be understood that chilling beyond 60 days does not impair product quality. It is believed that the fat particles of the homogenized product are set during the operation. In producing the salad dressing foam, the container is shaken vigorously for about 10 seconds, inverted, and the foam expelled by manipulating the valve.

In order to determine the permissable variations in the method of preparing our emulsion, the solid fat component of this invention was substituted for a conventional salad oil in the preparation of a salad dressing at ambient temperature. The resultant product was a water-in-fat emulsion which proved to be totally unsuited as a pressurized salad dressing. The product was too stiff to be expelled from the pressurized container. The water-in-fat emulsion was admixed with egg yolk or lecithin in the hope of converting the same to a fat-in-water emulsion. It was found that the resultant material contained fairly large visible fat particles in the aqueous medium, indicating that the attempted conversion was not successful. The product was nevertheless tested in a pressurized container, and the foam thus formed upon release of pressure was too unstable for commercial use. Further, most of the mixture remained in the container after all the gas was released.

After the salad dressing is made, it is preferably placed in a suitable pressure container at a temperature at which the fat component is in a melted state. Thereafter, the partially filled container is flushed with a soluble propellant gas for the purpose of removing any air or any other undesirable gases which may be present within the container. The container and valve used in this invention is the type disclosed in U. S. Patent No. 2,615,597. After the container has been purged with propellant gas, it is filled with a suitable edible propellant gas to a desired pressure of about 25 to about 100 p. s. i. g., more usually about 50 to about 90 p. s. i. g. The propellant gas which can be used for this purpose is well known to those skilled in the art as being one which is soluble, for example, to the extent of about 100 to 150 volumes of gas at standard conditions per 100 volumes of cold water. Specific examples of suitable propellant gases are nitrous oxide, nitrous oxide-carbon dioxide, nitrous oxide-carbon dioxide-nitrogen, etc. If carbon dioxide is used with nitrous oxide it constitutes about 10 to about 25% by volume of the total gaseous material. Further, if nitrogen is used as a component of the propellant gas it is present in the amount of about 25 to about 45% by volume. The quantity of propellant gas which is used in the pressurized container is determined by the desired over-run and the ultimate strength of the container.

Having thus provided a description of this invention, reference will now be made to specific examples for a fuller understanding thereof; however, it should be understood that no undue limitations or restrictions are to be imposed by reason thereof.

The Table I below contains a tabulation of constants for a number of vegetable oils and fats which were used in the evaluation of this invention. The oils are the conventional salad oils used in making conventional salad dressings, while the fats are the fat components of the novel salad dressings of the present invention.

TABLE I

*Constants of vegetable salad oils and fats in making pressurized salad dressings*

| Example Fats | Identity | Cold Test Value, Hours | Melting Point (Wiley), °F. | Setting, Point, °F.[2] | Iodine Value (Wijs) |
|---|---|---|---|---|---|
| A | Winterized cottonseed oil | 20 | 33.5 | | 114 |
| B | Winterized soya bean oil | 61 | 24.0 | | 135 |
| C | Winterized blended salad oil [1] | 32 | 35.5 | | 115 |
| 1 | Hydrogenated unwinterized cottonseed fat. | 0.0 | 95.7 | 70.0 | 77 |
| 2 | ----do---- | 0.0 | 90.7 | 60.2 | 85 |
| 3 | ----do---- | 0.0 | 82.2 | 56.3 | 90 |
| 4 | ----do---- | 0.0 | 105.2 | 86.2 | 64 |
| 5 | Hydrogenated unwinterized cottonseed stearine. | 0.0 | 99.3 | 78.8 | 73 |
| 6 | 50:50 blend of Example #2 and #5 | 0.0 | 95.7 | 69.8 | 79 |
| 7 | Hydrogenated unwinterized soya bean fat. | 0.0 | 86.0 | 59.5 | 88 |
| 8 | ----do---- | 0.0 | 106.4 | 88.0 | 67 |
| 9 | 30:10:26:34 blend of Examples 2, 5, 7, and 8. | 0.0 | 97.5 | 77.0 | 78 |
| 10 | Hydrogenated unwinterized coconut fat. | 0.0 | 98.9 | 80.5 | 0.3 |
| 11 | 50:50 blend of non-hydrogenated, unwinterized coconut oil and Example 8. | 0.0 | 95.2 | 75.5 | 38.5 |

[1] A 50:50 blend of winterized cottonseed oil with winterized hydrogenated soya bean oil of 115 iodine value.
[2] Maximum temperature obtained following dissipation of heat of crystallization after super cooling of the melted oil.

The following specific examples are presented to illustrate the present invention.

EXAMPLE 1.—SALAD DRESSING

| Ingredient: | Parts by weight |
|---|---|
| Paste component— | |
| Flour | 1.0 |
| Sucrose | 25.0 |
| Water | 20.0 |
| Total | 46.0 |
| | |
| Mayonnaise component— | |
| Egg yolk (10% salt) | 5.0 |
| Salt | 2.0 |
| Water | 7.5 |
| Hydrogenated unwinterized fat (Example fat 6, Table I) | 35.0 |
| Vinegar (100 grain) | 4.0 |
| Lemon juice (5-fold) | 0.3 |
| Flavoring | 0.2 |
| Total | 54.0 |
| | |
| Grand Total | 100.0 |

The salad dressing was prepared as follows: The paste component was first made by blending the flour and sugar in a bowl and adding to it the specified quantity of water. This mixture was heated with constant stirring to 190° F. and held at this temperature for 5 minutes. The water lost by evaporation during cooking was replaced and the paste component was allowed to cool to a temperature of about 108° F. and held at this temperature until used. Next the mayonnaise component was prepared by mixing the egg, salt and three-fourths of the water in a mixer and warming the mixture to about 108° F. The heating medium was held at about 130° F. The fat ingredient containing the fat-soluble flavoring was melted by warming to 108° F. and added slowly to the egg-salt-mix with mechanical agitation to yield a mayonnaise emulsion. The vinegar, lemon juice and remaining water were added to complete the mayonnaise emulsion. The paste component was added slowly to the mayonnaise emulsion to yield a salad dressing premix. The latter was passed through a conventional homogenizer to yield a pourable fat-in-water emulsion with fat particles of about 2.5 microns in average size.

A pressurized container was more than half-filled with seven fluid ounces of the warm salad dressing emulsion and flushed with a mixture (85:15) of nitrous oxide and carbon dioxide. The valve of the container was crimped into place, and more gas added until a pressure of about 90 pounds per square inch (gage) was attained while the entire unit was vigorously shaken during the gassing operation. Throughout the entire operation, the temperature of the components, of the mixture and of the emulsion was held at 105–110° F. The emulsion after packaging and gassing was held in the container overnight at 45° F. In producing the salad dressing foam, the container was shaken vigorously for about 10 seconds, inverted and the foam expelled by manipulating the valve. The resulting foam had an over-run of 345% and a foam stability of 70 minutes at room temperature. About 10% of the salad dressing remained in the container after it had been completely depressurized.

EXAMPLE 2.—SALAD DRESSING

| Ingredient: | Parts by weight |
|---|---|
| Vegetable gum | 0.15 |
| Sucrose | 25.00 |
| Water | 33.35 |
| Egg yolk (10% salt) | 5.00 |
| Salt | 2.00 |
| Hydrogenated unwinterized fat (Example fat 9, Table I) | 30.00 |
| Vinegar (100 grain) | 4.00 |
| Lemon juice (5-fold) | 0.30 |
| Flavoring | 0.20 |
| Total | 100.00 |

In making the salad dressing emulsion in this example, the sucrose, one-third of the water, egg yolk and salt were added to a mixing bowl and mixed until the dry ingredients were dissolved. The mixture was then heated to a temperature of 113° F. The hydrogenated fat was melted by warming to 113° F. and stirred to insure a uniform blend. The vegetable gum and flavoring were added to the melted fat and the resulting fat-vegetable gum dispersion was slowly added to the egg mix with mechanical agitation to yield a salad dressing emulsion. The remaining water, vinegar and lemon juice were heated to 113° F. and were added to complete the salad dressing emulsion premix. The latter was passed through a conventional homogenizer to yield a pourable fat-in-water emulsion with fat particles of about 4.5 microns in average size. The homogenized salad dressing emulsion was packaged as described in Example 1. Throughout the entire operation, the temperature of the ingredients, mixture and emulsion was held at 110–115° F. The emulsion after packaging and gassing was held at 75° F. for two weeks and then stored at 25° F. for one day before expulsion from the container. In producing the salad dressing foam, the container was shaken vigorously for about 10 seconds, inverted and the foam expelled by manipulating the valve. The resulting foam had an over-run of 320% and a foam stability of more than 300 minutes at 25° F. About 17% of the salad dressing could not be expressed from the container.

EXAMPLE 3.—SALAD DRESSING

| Ingredient: | Parts by weight |
|---|---|
| Paste component— | |
| Flour | 1.0 |
| Sucrose | 25.0 |
| Water | 20.0 |
| Total | 46.0 |
| | |
| Mayonnaise component— | |
| Egg yolk (10% salt) | 5.0 |
| Salt | 2.0 |
| Water | 12.5 |
| Hydrogenated unwinterized fat (Example fat 5, Table I) | 30.0 |
| Vinegar (100 grain) | 4.0 |
| Lemon juice (5-fold) | 0.3 |
| Flavoring | 0.2 |
| Total | 54.0 |
| | |
| Grand total | 100.0 |

The salad dressing was prepared as follows: The paste component was first made by blending the flour and sugar in a bowl and adding to it the specified quantity of water. This mixture was heated with constant stirring to 190° F. and held at this temperature for 5 minutes. The water lost by evaporation during cooking was replaced and the paste component was allowed to cool to a temperature of about 95° F. and held at this temperature until used. Next the mayonnaise component was prepared by mixing the egg, salt and two-thirds of the water in a mixer and warming the mixture to about 95° F. The fat ingredient containing the fat-soluble flavoring was melted and then held at 95° F. and added slowly to the egg-salt-mix with mechanical agitation to yield a mayonnaise emulsion. The vinegar, lemon juice and remaining water were added to complete the mayonnaise emulsion. The paste component was added slowly to the mayonnaise emulsion to yield a salad dressing pre-mix. The latter was passed through a conventional homogenizer to yield a pourable fat-in-water emulsion with fat particles of about 3 microns in average size.

The homogenized salad dressing emulsion was packaged as described in Example 1. Throughout the entire operation, the temperature of the ingredients, mixture and emulsion was held at 93–97° F. The emulsion after packaging and gassing was held at 72° F. for four weeks. In producing the salad dressing foam, the container was shaken vigorously for about 10 seconds, inverted and the foam expelled by manipulating the valve. The resulting foam had an over-run of 330% and a foam stability of about 18 minutes. About 5% of the salad dressing could not be expressed from the container.

EXAMPLE 4.—SALAD DRESSING

Ingredient:

| Paste component— | Parts by weight |
|---|---|
| Flour | 1.0 |
| Sucrose | 20.0 |
| Water | 20.0 |
| Total | 41.0 |

| Mayonnaise component— | |
|---|---|
| Egg yolk (10% salt) | 5.0 |
| Salt | 2.0 |
| Water | 7.5 |
| Hydrogenated unwinterized fat (Example fat 3, Table I) | 40.0 |
| Vinegar (100 grain) | 4.0 |
| Lemon juice (5-fold) | 0.3 |
| Flavoring | 0.2 |
| Total | 59.0 |
| Grand total | 100.0 |

The salad dressing was prepared as follows: The paste component was first made by blending the flour and sugar in a bowl and adding to it the specified quantity of water. This mixture was heated with constant stirring to 190° F. and held at this temperature for 5 minutes. The water lost by evaporation during cooking was replaced and the paste component was allowed to cool to a temperature of about 93° F. and held at this temperature until used. Next the mayonnaise component was prepared by mixing the egg, salt and three-fourths of the water in a mixer and warming the mixture to about 93° F. The fat ingredient containing the fat-soluble flavoring was melted by warming to 93° F. and added slowly to the egg-salt-mix with mechanical agitation to yield a mayonnaise emulsion. The vinegar, lemon juice and remaining water were heated to 93° F. and added to complete the mayonnaise emulsion. The paste component was added slowly to the mayonnaise emulsion to yield a salad dressing premix. The latter was passed through a conventional homogenizer to yield a pourable fat-in-water emulsion with fat particles of about 3 microns in average size. The homogenized salad dressing was packaged as described in Example 1. Throughout the entire operation, the temperature of the ingredients, the mixture and emulsion was held at 90–95° F. The emulsion after packaging and gassing was held at 25° F. for 3 weeks before expulsion from the container. In producing a salad dressing foam, the container was shaken vigorously for about 10 seconds, inverted and the foam expelled by manipulating the valve. The resulting foam had an over-run of 310% and a foam stability of 20 minutes at room temperature. About 14% of the salad dressing could not be expressed from the container.

EXAMPLE 5.—SALAD DRESSING

Ingredient:

| Paste component— | Parts by weight |
|---|---|
| Flour | 1.0 |
| Sucrose | 30.0 |
| Water | 20.0 |
| Total | 51.0 |

| Mayonnaise component— | |
|---|---|
| Egg yolk (10% salt) | 5.0 |
| Salt | 2.0 |
| Water | 12.5 |
| Hydrogenated unwinterized fat (Example fat 8, Table I) | 25.0 |
| Vinegar (100 grain) | 4.0 |
| Lemon juice (5-fold) | 0.3 |
| Flavoring | 0.2 |
| Total | 49.0 |
| Grand total | 100.0 |

The salad dressing was prepared as follows: The paste component was first made by blending the flour and sugar in a bowl and adding to it the specified quantity of water. This mixture was heated with constant stirring to 190° F. and held at this temperature for 5 minutes. The water lost by evaporation during cooking was replaced and the paste component was allowed to cool to a temperature of about 118° F. and held at this temperature until used. Next the mayonnaise component was prepared by mixing the egg, salt and two-thirds of the water in a mixer and warming the mixture to about 118° F. The fat ingredient containing the fat-soluble flavoring was melted by warming to 118° F. and added slowly to the egg-salt-mix with mechanical agitation to yield a mayonnaise emulsion. The vinegar, lemon juice and remaining water were heated to about 118° F. and added to complete the mayonnaise emulsion. The paste component was added slowly to the mayonnaise emulsion to yield a salad dressing premix. The latter was passed through a conventional homogenizer to yield a pourable fat-in-water emulsion with fat particles of about 8 microns in average size. The homogenized salad dressing was packaged as described in Example 1. Throughout the entire operation, the temperature of the ingredients, the mixture and emulsion was held at 115–120° F. The emulsion after packaging and gassing was held at 65° F. for 1 week before expulsion from the container. In producing a salad dressing foam, the container was shaken vigorously for about 10 seconds, inverted and the foam expelled by manipulating the valve. The resulting foam, somewhat curdled in appearance, had an over-run of 290% and a foam stability of about 20 minutes at room temperature. About 40% of the salad dressing could not be expressed from the container.

In Table II below, a summary of results which were obtained by using the oils and fats of Table I in making the novel products of this invention is given.

TABLE II
Evaluation of products of this invention

| Example Fats | Conc. in Salad Dressing,[1] Percent | Residuum in Container,[2] Percent | Average Foam Over-Run,[3] Percent | Foam Stability,[4] Minutes |
| --- | --- | --- | --- | --- |
| A, B or C | 30 | 5 | about 250 | 0.5 |
|  | 60 | 55 | about 200 | 0.5 |
| 1 | 30 | 10 | 310 | 70 |
|  | 40 | 30 | 390 | 90 |
|  | 50 | 70 | 420 | 120 |
| 2 | 30 | 8 | 300 | 30 |
| 3 | 30 | 7 | 290 | 15 |
| 4 | 30 | 45 | 300 | 120+ |
|  | 25 | 10 | 280 | 70 |
| 5 | 30 | 18 | 300 | 120 |
|  | 40 | 70 | 340 | 120+ |
| 6 | 35 | 10 | 345 | 70 |
| 7 | 30 | 9 | 310 | 25 |
| 8 | 30 | 50 | 300 | 120+ |
| 9 | 30 | 15 | 320 | 80 |
| 10 | 30 | 23 | 325 | 120 |
| 11 | 30 | 15 | 330 | 90 |

[1] Seven fluid ounces of emulsion in a 12 fluid ounce container, the emulsion packed under 90 pounds pressure per square inch gage, the gas being 85% nitrous oxide and 15% carbon dioxide.
[2] After chilling to 45° F. for at least 24 hours, shaking container and contents vigorously for 10 seconds before each of 7 consecutive withdrawals from the container, at which point no more product at 45° F. could be expelled.
[3] Foam volume over and above the original liquid emulsion volume.
[4] Time required for a noticeable decrease in volume of foam exposed to air at room temperature. Tests were terminated after 120 minutes.

It can be seen from Table II above that those emulsions prepared from conventional salad oils are not suited for this invention because the foam is not sufficiently stable. Further, it should be noted that for the fat components coming within the scope of the invention, the higher the melting and setting points, the greater the stability of foam; however, the residiuum in the container increases undesirably. Nevertheless, for the range of fats used, the resultant emulsions are satisfactory for the purpose of this invention.

An additional series of experiments were made in which the average particle size of the fat component was varied. The results are given in Table III below.

TABLE III
Influence of particle size on salad dressing foam [1]

| Fat Particle Size,[2] Microns | Foam Over-Run, Percent | Residuum in Container, Percent | Foam Appearance |
| --- | --- | --- | --- |
| 2-3 | 350 | 10 | Smooth. |
| 5-7 | 250 | 20 | Sl. rough. |
| 9-16 | 200 | 45 | Curdled. |
| 18-40 | 150 | 65 | Very curdled. |

[1] The salad dressing made with Example fat #6 in 35% concentration in accordance with both formula and method such as given in Example 1, Salad Dressing.
[2] Ranges listed cover at least 75% of the fat phase.

The following Table IV illustrates the foam over-runs of consecutive samples from one pressurized container of emulsion coming within the invention.

TABLE IV
Foam over-runs of consecutive samples of a typical salad dressing expelled from one container [1]

| Withdrawal sample of 80 ml. volume: | Over-run, percent |
| --- | --- |
| First | 460 |
| Second | 405 |
| Third | 380 |
| Fourth | 350 |
| Fifth | 315 |
| Sixth | 270 |
| Seventh | 240 |
| Average | 345 |

[1] The novel salad dressing made with Example fat #6 in 35% concentration in accordance with both formula and method such as given in Example 1, Salad Dressing.

The stability of the salad dressing of this invention at low temperatures for long periods is shown by Table V below.

TABLE V
Influence of storage conditions on salad dressing foams [1]

| Stored at respective temperatures | | Residuum in Container | Average Over-run | Foam Stability |
| --- | --- | --- | --- | --- |
| 75° F. | 45° F. | | | |
| Days | Days | Percent | Percent | Min. |
| 15 |  | 9 | 355 | 2 |
| 29 |  | 10 | 320 | 2 |
| 43 |  | 9 | 325 | 2 |
| 57 |  | 10 | 320 | 2 |
| 85 |  | 8 | 320 | 2 |
|  | 15 | 10 | 330 | 70 |
|  | 29 | 14 | 350 | 70 |
|  | 43 | 11 | 330 | 70 |
|  | 57 | 14 | 330 | 70 |
|  | 85 | 16 | 325 | 70 |
| 14 | 1 | 12 | 340 | 70 |
| 28 | 1 | 16 | 340 | 70 |
| 42 | 1 | 10 | 345 | 70 |
| 56 | 1 | 13 | 330 | 70 |
| 84 | 1 | 15 | 305 | 70 |

[1] The novel salad dressing made with Example fat #6 in 35% concentration in accordance with both formula and method such as given in Example 1, Salad Dressing.

While the product of this invention has been described in connection with pressurized containers of the type requiring inversion in order to make possible the expulsion of the contents, it should be understood that any type of container can be used for the purpose including the type containing a standpipe.

Having thus given a written description of the invention along with specific examples, it should be understood that no undue limitations or restrictions are to be imposed by reason thereof, but that the scope of the invention is defined by the appended claims.

What is claimed is:

1. A composition of matter adapted to be dispensed from a pressurized container for use as a salad dressing comprising an emulsion of fat particles dispersed in an aqueous medium having a pH of about 3 to 5, said emulsion containing an edible emulsifying agent and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, and the fat being between about 20 and 50% by weight of the emulsion and said emulsion being free flowing at room temperature 2. The composition of claim 1 wherein the emulsifying agent is an egg yolk-containing material.

3. The composition of claim 1 wherein the acidifying agent is selected from the group consisting of vinegar, lemon juice, and citric acid.

4. A foam-like composition of matter adapted for use as a salad dressing comprising a co-emulsion of fat particles and fine globules of edible gas dispersed in an aqueous medium having a pH of about 3 to 5, said emulsion containing an edible emulsifying agent and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns and the fat being between about 20 and 50% by weight of the emulsion.

5. A composition of matter adapted to be dispensed from a pressurized container for use as a salad dressing comprising an emulsion of fat particles dispersed in an aqueous medium having a pH of about 3 to 5, said emulsion containing an edible emulsifying agent and an edible acidifying agent, said fat containing a hydrogenated vegetable fat and having a melting point between about 80° and 110° F., an iodine value of between about 60 and 95, and a setting point between about 55° and 90° F., said fat particles being homogeneous in composition and having an average size of less than about 10 microns, and the fat being between about 20 and 50% by weight of the emulsion and said emulsion being free flowing at room temperature.

6. A composition of matter adapted to be dispensed from a pressurized container for use as a salad dressing comprising an emulsion of fat particles dispersed in an aqueous medium having a pH of about 3 to 5, said emulsion containing an edible emulsifying agent and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, the fat being between about 20 and 50% by weight of the emulsion, said emulsion being free flowing at room temperature and said emulsion having dissolved therein an edible propellant gas.

7. A method which comprises combining a vegetable fat in a melted state having a melting point of between about 80° and 110° F. and a setting point of between about 55° and 90° F., an aqueous medium, an edible emulsifying agent, and an edible acidifying agent at an elevated temperature sufficient to maintain said fat in a melted state, said fat being between about 20 and 50% by weight of the emulsion, homogenizing the resultant mixture at an elevated temperature at which the fat exists in a melted state thereby producing homogeneous particles of average size of less than about 10 microns, and subjecting the homogenized product to a temperature below the setting point of said fat for a period sufficient to at least partially solidify the same and said homogenized product being free flowing at room temperature.

8. A composition of matter adapted to be dispensed from a pressurized container for use as a salad dressing comprising an emulsion of fat particles dispersed in an aqueous medium having a pH of about 3 to 5, said emulsion containing an edible emulsifying agent, a water binding agent, and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, and the fat being between about 20 and 50% by weight of the emulsion and said emulsion being free flowing at room temperature.

9. The composition of claim 8 wherein the water binding agent is selected from the group consisting of starch, gelatin, flour, and vegetable gum.

10. A composition of matter adapted to be dispensed from a pressurized container for use as a salad dressing comprising an emulsion of fat particles dispersed in an aqueous medium having a pH of about 3 to 5, said emulsion containing an edible emulsifying agent, a flavoring agent, and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, and the fat being between about 20 and 50% by weight of the emulsion and said emulsion being free flowing at room temperature.

11. The composition of claim 10 wherein the flavoring agent is selected from the group consisting of sodium chloride and sugar.

12. A composition of matter adapted to be dispensed from a pressurized container for use as a salad dressing comprising an emulsion of fat particles dispersed in an aqueous medium having a pH of about 3 to 5, said emulsion containing an edible emulsifying agent selected from the group consisting of egg yolk and whole egg, an edible acidifying agent selected from the group consisting of vinegar, lemon juice, and citric acid, and a water binding agent selected from the group consisting of starch, gelatin, flour, and vegetable gum, said fat containing a hydrogenated vegetable fat and having a melting point between about 80° and 110° F. and a setting point between about 55° and 90° F., said fat particles being homogeneous in composition and having an average size of less than about 10 microns, and the fat being between about 20 and 50% by weight of the emulsion and said emulsion being free flowing at room temperature.

13. A composition of matter adapted to be dispensed from a pressurized container for use as a salad dressing comprising an emulsion of fat particles dispersed in an aqueous medium having a pH of about 3 to 5, said emulsion containing an edible emulsifying agent and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, the fat being between about 20 and 50% by weight of the emulsion, said emulsion being free flowing at room temperature and said emulsion having dissolved therein an edible nitrous oxide-containing gas.

14. The composition of claim 13 wherein the nitrous oxide-containing gas is nitrous oxide and carbon dioxide.

15. The composition of claim 13 wherein the nitrous oxide-containing gas is nitrous oxide, nitrogen, and carbon dioxide.

16. The method of claim 7 wherein homogenization is effected at a temperature of at least about 10° F. above the melting point of the fat and up to about 130° F. and the homogenized product is subjected to a temperature of at least about 10° F. below the setting point of the fat and above the freezing point of the aqueous medium.

17. A method which comprises combining a vegetable fat in the melted state having a melting point between about 80° and 110° F. and a setting point between about 55° and 90° F., an aqueous medium, an edible emulsifying agent, and an edible acidifying agent at an elevated temperature sufficient to maintain said fat in a melted state, said fat being between about 20 and 50% by weight of the emulsion, homogenizing the resultant mixture at an elevated temperature at which the fat exists in a melted state thereby producing homogeneous fat particles of average size of less than about 10 microns, subjecting the homogenized product to a temperature below the setting point of said fat for a period sufficient to at least partially solidify the same, said homogenized product being free flowing at room temperature and dissolving a substantial quantity of an edible propellant gas therein.

18. A method of pressurizing a salad dressing which comprises partially filling an enclosed zone with the salad dressing containing a hydrogenated vegetable fat existing at a temperature at which the fat contained therein is in a melted state, subjecting the salad dressing to an elevated pressure by means of an edible, soluble, propellant gas, chilling the salad dressing to a temperature below the setting point of said fat until at least partial solidification of the same is obtained, said fat having a melting point between about 80° and 110° F., a setting point of between about 55° and 90° F., and constituting between about 20 and 50% by weight of the salad dressing, and composed of homogeneous particles having an average size of less than about 10 microns and said salad dressing being free flowing at room temperature.

19. The method of claim 18 wherein the edible, soluble gas is a nitrous oxide-containing gas.

20. A method which comprises combining a vegetable fat in a melted state having a melting point between about 80° and 110° F. and a setting point of between about 55° and 90° F., an aqueous medium, an edible emulsifying agent selected from the group consisting of egg yolk and whole egg, and an edible acidifying agent selected from the group consisting of vinegar, lemon juice, and citric acid at an elevated temperature sufficient to maintain said fat in a melted state, said fat being between about 20 and 50% by weight of the emulsion, homogenizing the resultant mixture at an elevated temperature at which the fat exists in a melted state thereby producing homogeneous fat particles having an average size of less than about 10 microns, subjecting the homogenized product to a temperature below the setting point of said fat and above the freezing point of the aqueous medium for a period sufficient to at least partially solidify the same, said elevated temperatures being not greater than about 130° F., said homogenized product being free flowing at room temperature and said acidifying agent is added in a quantity sufficient to provide the final composition with a pH between about 3 and 5.

21. The method of claim 20 being further characterized in that the homogenized product contains a water binding agent selected from the group consisting of starch, gelatin, flour and vegetable gum.

22. A composition of matter adapted to be dispensed from a pressurized container for use as a salad dressing comprising an emulsion of fat particles dispersed in an aqueous medium having a pH of about 3 to 5, said emulsion containing an edible emulsifying agent and an edible acidifying agent, said fat containing a hydrogenated vegetable fat and having a melting point between about 80° and 110° F. and a setting point between about 55° and 90° F., said fat particles being homogeneous in composition and having an average size of less than about 10 microns, the fat being between about 20 and 50% by weight of the emulsion being free flowing at room temperature and said emulsion having dissolved therein an edible, soluble propellant gas and being maintained in a container under super-atmospheric pressure, and said composition on expulsion from an orifice in said container forming a foam having an overrun of at least about 100% and said foam being stable for at least about 10 minutes.

References Cited in the file of this patent

UNITED STATES PATENTS

| | | |
|---|---|---|
| 1,701,084 | Richardson et al. | Feb. 5, 1929 |
| 2,203,643 | Musher | June 4, 1940 |
| 2,294,172 | Getz | Aug. 25, 1942 |
| 2,313,033 | Joffe | Mar. 2, 1943 |
| 2,435,682 | Getz | Feb. 10, 1948 |